United States Patent

Taketani

[11] Patent Number: 4,844,226
[45] Date of Patent: Jul. 4, 1989

[54] CLUTCH COVER ASSEMBLY
[75] Inventor: Akio Taketani, Shijonawate, Japan
[73] Assignee: Kabushiki Kaisha Daikin Seisakusho, Neyagawa, Japan
[21] Appl. No.: 883,639
[22] Filed: Jul. 9, 1986
[30] Foreign Application Priority Data Jul. 18, 1985 [JP] Japan .................. 60-110108[U]

[51] Int. Cl.⁴ .................................. F16D 13/75
[52] U.S. Cl. ............................ 192/111 A; 192/89 B
[58] Field of Search ............ 192/111 A, 70.28, 70.27, 192/70.26, 70.25, 89 B

[56] References Cited

U.S. PATENT DOCUMENTS

| | | | |
|---|---|---|---|
| 2,280,870 | 4/1942 | Thelander | 192/70.28 X |
| 4,207,972 | 6/1980 | Zeidler | 192/111 A |
| 4,558,771 | 12/1985 | Després | 192/70.28 X |
| 4,560,055 | 12/1985 | Billet | 192/70.28 X |
| 4,562,636 | 1/1986 | Carmillet | 192/89 B X |
| 4,566,573 | 1/1986 | Lane, Jr. | 192/70.28 X |
| 4,602,708 | 7/1986 | Nagaw | |

Primary Examiner—David A. Scherbel
Assistant Examiner—Creighton Smith
Attorney, Agent, or Firm—Bradford E. Kile

[57] ABSTRACT

A clutch cover assembly comprising a pressure plate for pressing a friction facing onto a flywheel, a clutch cover fixed to the flywheel, a diaphragm spring for forcing the pressure plate toward the flywheel and an elastic strap which unrotatably and axially movably connects the pressure plate to the clutch cover, characterized in that, the pressure plate is provided with a rearwardly projected part which is projected oppositely to the flywheel beyond the clutch cover through a recess in the clutch cover and is provided at its projected rear end with a spring seat, and an adjustment spring formed by a compressible spring is interposed between the spring seat and the clutch cover.

2 Claims, 1 Drawing Sheet

CLUTCH COVER ASSEMBLY

BACKGROUND OF THE INVENTION

The present invention relates to a clutch cover assembly, in which a diaphragm spring is used as a spring for actuating the pressure plate.

Generally, in a friction clutch of a diaphragm spring type, a diaphragm spring is seated on a rear surface of a pressure plate for actuating the pressure plate. Actuation of the pressure plate presses a friction facing of a clutch disc onto a flywheel to engage the clutch.

As opposed to other types of compressible springs, a diaphragm spring has a characteristic that, in a condition in which the spring is compressed to some extent, the compression load temporarily increases in accordance with a reduction of the compressed length. On the other hand, when a facing of the clutch disc is worn to some extent, after use, the position of the pressure plate in the clutch engaged condition changes toward the flywheel side from an initial position, so that the compressed length of the diaphragm spring reduces from the initial value.

Therefore, when the facing is worn, the load applied by the diaphragm spring to the pressure plate increases, and thus, the pressing force between the friction facing and the flywheel increases. Consequently, temperature at the surface of the facing increases which causes abnormal wear of the facing. This also prevents smooth operation of the clutch.

In order to avoid the above disadvantages, an improved structure has been proposed in Japanese Utility Model application No. 57-55043 and corresponding U.S. Pat. No. 4,602,208; of common assignment with the instant application. In this structure, an adjustment spring which has a characteristics similar to that of a diaphragm spring is associated with the diaphragm spring so that a pressure plate may receive a load corresponding to the difference between the elastic forces of both springs.

However, since said adjustment spring is disposed at the vicinity of a fulcrum mechanism of the diaphragm spring, it may be difficult to locate the adjustment spring if there is not sufficient space at the vicinity of the fulcrum mechanism.

Accordingly, it is an object of the present invention to provide an improved clutch cover assembly, overcoming the abovenoted disadvantages.

SUMMARY OF THE INVENTION

According to the present invention, a clutch cover assembly includes a pressure plate for pressing a friction facing onto a flywheel. A clutch cover is fixed to the flywheel, a diaphragm spring for forcing the pressure plate toward the flywheel and an elastic strap which axially connects the pressure plate to the clutch cover. The pressure plate is provided with a rearwardly projected part which is projected in a direction opposite to the flywheel and beyond the clutch cover through a recess in the clutch cover and is provided at its projected rear end with a spring seat. An adjustment spring, formed by a compressible spring is interposed between the spring seat and the clutch cover.

According to the above structure, in an engaged condition of the clutch, the diaphragm spring applies a load directed toward the flywheel (i.e., a load in the engaging direction) to the pressure plate. On the other hand, the adjustment spring applies a reversely directed load (i.e., a load in a disengaging direction) to the pressure plate. Therefore, the force by the pressure plate for pressing the facing onto the flywheel is the difference between said two loads.

When the facing is worn, and thus, the position of the pressure plate in the clutch engaged condition changes from an initial position toward the flywheel side, the compressed or deflection distance of the diaphragm spring at the clutch engaged condition decreases, and thus, the diaphragm spring applies a larger load in the engaging direction to the pressure plate. On the other hand, when the position of the pressure plate changes toward the flywheel, the projected part also moves in the same direction, so that the compressed length of the adjustment spring between the projected part and the clutch cover increases, and thus, the adjustment spring applies a larger load in the disengaging direction to the pressure plate. Therefore, even when the facing is worn, the actual and effective pressing force applied from the pressure plate to the facing does not substantially change, and the pressing force between the facing and the flywheel is maintained at a substantially constant value. Therefore, abnormal heating and abnormal wear of the facing are prevented.

Other and further objects, features and advantages of the invention will appear more fully from the following description of a preferred embodiment of the invention.

DETAILED DESCRIPTION OF A PREFERRED EMBODIMENT

Figure 1:
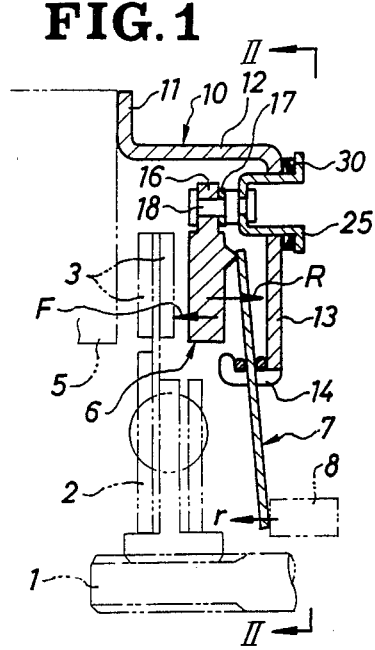
FIG. 1 is a schematic sectional view of a part of a clutch including an embodiment of the invention.

As shown in FIG. 1, a clutch disc 2, splined to a clutch output shaft 1, is provided at a radially outer portion with an annular friction facing 3. The facing 3 is disposed between a flywheel 5 of an engine and an annular pressure plate 6 a rear surface, opposite to the clutch disc 2, of the pressure plate 6 is supported by an outer peripheral portion of an annular diaphragm spring 7. The inner peripheral portion of the diaphragm spring 7 is connected to a release bearing 8, which is connected to an operation mechanism (not shown) such as a clutch pedal. When the operation mechanism is operated, the release bearing 8 pushes the inner peripheral portion of the spring 7 in a direction of an arrow r to deflect the spring 7, so that the spring 7 moves the pressure plate 6 in an releasing direction R to disengage the clutch. When the clutch operation mechanism is released, the release bearing 8 releases the force against the spring 7, so that the pressure plate 6 is forced in an engaging direction F by the spring 7 pressing the facing 3 onto the flywheel 5 to engage the clutch.

The outer periphery and rear surface of the pressure plate 6 is enhoused within a clutch cover 10. The clutch cover 10 is integrally provided with a flange 11 fixed to the outer peripheral portion of the flywheel 5, a cylindrical or tapered wall 12 which extends from the inner periphery of the flange 11 toward the rear side (in the disengaging direction R) and an annular end wall 13 extends radially inwardly from the rear end of the peripheral wall 12. The end wall 13 is provided at the inner peripheral portion with a support mechanism 14 which forms a fulcrum for the diaphragm spring 7. The support mechanism 14 includes tabs or pins (not shown), which support the radially middle portion of the diaphragm spring 7 by means of wire rings.

Figure 2:
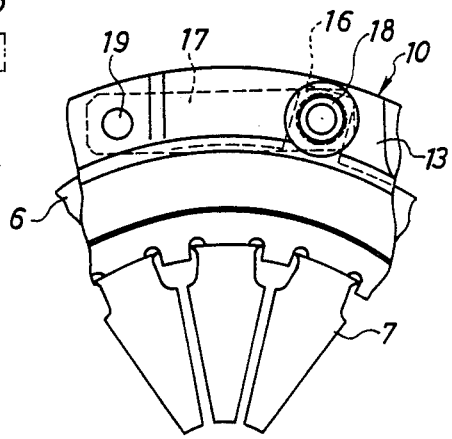
FIG. 2 is a schematic enlarged view taken along line II—II in FIG. 1.

As shown in FIG. 2, the pressure plate 6 is provided at the outer periphery with circumferentially spaced radial projections 16 (only one is shown). Each projection 16 is connected to the end wall 13 of the clutch cover 10 by means of an elastic strap 17, which extends in a tangential direction of the pressure plate 6. One end of each strap 17 is fixed to the rear surface of the projection 16 by a rivet 18, and the other end is fixed to the inner surface of the end wall 13 by a rivet 19. The straps 17 connect the pressure plate 6 to the clutch cover 10 to permit relative axial movement without rotation.

Figure 3:
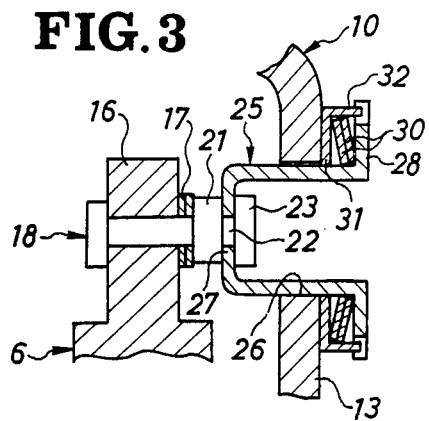
FIG. 3 is a schematic enlarged view of FIG. 1.

As shown in FIG. 3, each strap 17 is fixedly held between the rear surface of the projection 16 and a large-diameter portion 21 formed at the rear portion of the rivet 18. Each rivet 18 includes a shaft portion 22 of a small diameter extending rearwardly from the large-diameter portion 21 and a head 23 formed at the rear end of the shaft portion 22. These portions 21, 22 and 23 fix a cylindrical member 25 to the rivet 18. The member 25 is slidably fitted into a hole 26 or a recess formed through the end wall 13 of the clutch cover 10. The member 25 includes a radially inward flange 27 at the front end and a radially outward flange 28 at the rear end. The flange 27 is fitted around the shaft portion 22 of the small diameter and is fixedly held between the portion 21 and the head 23. The flange 28 is positioned at the rear of the end wall 13. Conical springs 30 are interposed between the flange 28 and rear surface of the end wall 13. In the illustrated embodiment, an annular friction plate 31 is interposed between the conical spring 30 and the end wall 13. The friction plate 31 is provided at the outer periphery with rearwardly extending protrusions 32, which slidably engage into recesses at the outer periphery of the flange 28.

According to the structure detailed above, when the facing 3 is worn, the position of the pressure plate 6 at the clutch engaged condition changes toward the flywheel 5, and thus, the deflection length of the diaphragm spring 7 reduces to disengage the clutch. Further, when the engaged position of the pressure plate 6 changes toward the flywheel side, the rivets 18 and the members 25 also move in the same direction together with the pressure plate 6, so that the conical springs 30 between the flanges 28 and end the wall 13 are further deflected. The diaphragm spring 7 and the conical springs 30 have characteristics, in which the deflection load changes with respect to the position of the pressure plate 6, as shown in FIG. 4.

Figure 4:
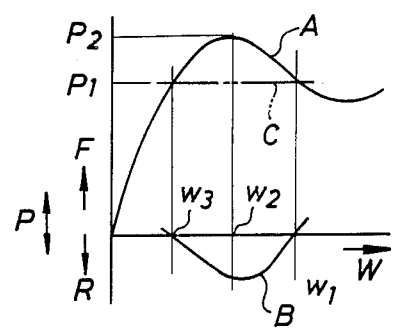
FIG. 4 is a graph indicating load characteristics.

In FIG. 4, the vertical axis indicates a load P, and the horizontal axis indicates a distance W of the pressure plate 6 from a reference point or position; "w1" indicates a value of the distance W when the facing 3 is not worn while "w3" indicates a value of the distance W when the facing 3 is worn to a limit.

The diaphragm spring 7 has a characteristic, as shown by a curve A, in which as the distance W decreases to a value of w2, i.e., as the deflection length reduces, the deflection load P increase from a value of p1 to a value of p2, and then, as the distance W further decreases to the value of w3, the deflection load P decreases to the initial value p1.

On the other hand, the conical springs 30 have, as a whole, a characteristic, as shown by a curve B, in which, as the distance W decreases from an initial value of w1 to a value of w2, i.e., as the deflection distance increases, the deflection load P increases, and then, as the distance W further decreases to the value of w3, the deflection load P decreases substantially to the initial value.

The pressing force applied to the facing 3 by the pressure plate 6 is a difference between said two loads, so that the pressing force is maintained substantially constant, as shown by a line C, even when the distance W changes from the value of w1 to the value of w3. Therefore, the pressing force applied to the facing 3 by the pressure plate 6 is maintained at a constant value independently of the wear thickness of the facing 3.

According to the present invention, as detailed hereinabove, the pressure plate 6 includes the projected parts which includes, e.g., the rivets 18 and the members 25, and conical springs 30 (adjustment springs) are disposed between said projected parts and the clutch cover 10, so that the conical springs 30 may function to maintain the pressing force against the facing 3 by the pressure plate 6, i.e., the pressure between the facing 3 and the flywheel 5, at the substantially constant value. Therefore, abnormal heating and abnormal wear by the heat of the facing 3 can be prevented. Further, a force required for the operation of the diaphragm spring 7 is maintained constant, and thus, the clutch can always be smoothly operated.

Further, since the conical springs 30 are associated with the pressure plate 6, the springs 30 can be assembled in the clutch even when there is little space at the vicinity of the support mechanism 14 of the diaphragm spring 7.

The conical springs 30 have non-linear characteristic similarly to that of the diaphragm spring 7. Therefore, as shown in the illustrated embodiment, when the conical springs 30 are used as the adjustment springs, the pressing force of the pressure plate 6 can be maintained at the constant value for a long term, i.e., until the distance W decreases to the limit value w3.

If it is required to maintain a constant pressing force only at an area between the initial value of w1 and the intermediate value w2, the adjustment springs may be formed by springs such as wave springs, of which changes in deflection length and deflection load are substantially proportional with respect to each other.

Although the invention has been described in its preferred form with a certain degree of particularity, it is understood that the present disclosure of the preferred form may be changed in the details of construction and the combination and arrangement of parts may be rendered without departing from the spirit and scope of the invention as hereinafter claimed.

What is claimed is:

1. A clutch cover assembly comprising a pressure plate for pressing a friction facing onto a flywheel, a clutch cover fixed to the flywheel, a diaphragm spring for forcing the pressure plate toward the flywheel and an elastic strap which unrotatably and axially movably connects the pressure plate to the clutch cover, characterized in that, said pressure plate is provided with a rearwardly projected part which is projected oppositely to the flywheel beyond the clutch cover through a recess in the clutch cover and is provided at its projected rear end with a spring seat, said projected part includes a rivet for fixing the elastic strap to the pressure plate and a substantially cylindrical member fixed to the rear end of said rivet, said spring seat is formed by a radially outward flange provided at the rear end of said cylindrical member;

and an adjustment spring formed by a compressible spring is interposed between said spring seat and the clutch cover.

2. A clutch cover assembly of claim 1 wherein said adjustment spring is formed by a conical spring which has a spring characteristic similar to but acting in an opposite direction to that of the diaphragm spring.

* * * * *